Oct. 6, 1953 — O. F. CALOIARO — 2,654,412
AUTOMOBILE WHEEL TRACTION DEVICE
Filed April 16, 1952
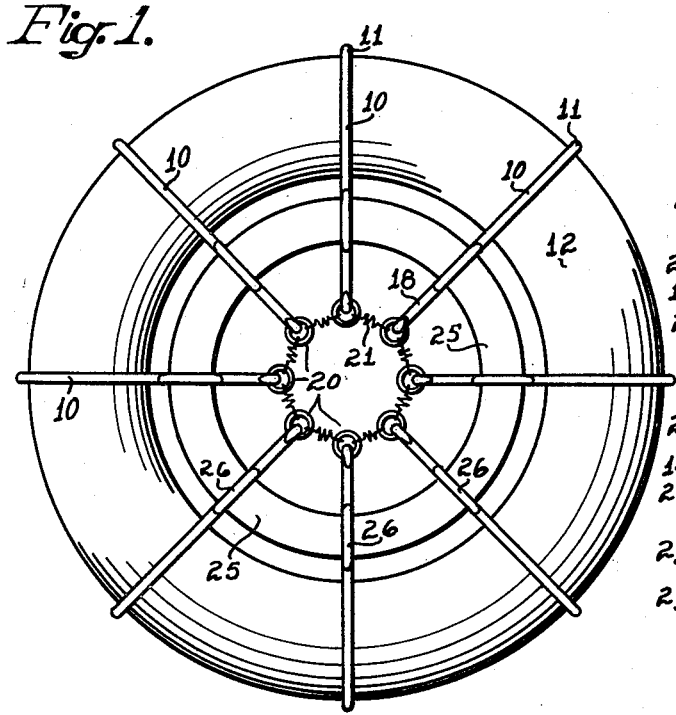
Fig. 1.
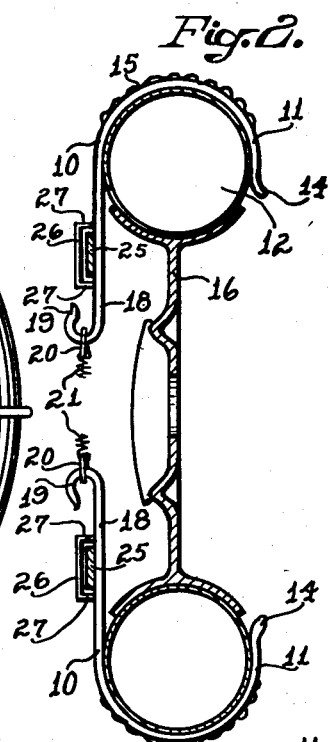
Fig. 2.
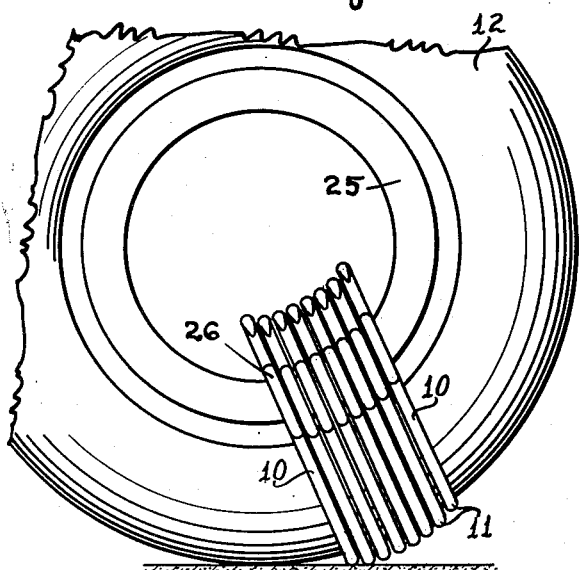
Fig. 3.
Fig. 4.
INVENTOR.
Ozzie F. Caloiaro
BY
Clayton L. Jenks Patented Oct. 6, 1953

2,654,412

UNITED STATES PATENT OFFICE 2,654,412

AUTOMOBILE WHEEL TRACTION DEVICE

Ozzie F. Caloiaro, Rutland, Mass.

Application April 16, 1952, Serial No. 282,570

3 Claims. (Cl. 152—226)

This invention relates to an automobile wheel traction device and more particularly to that construction which is familiarly known as a tire chain.

One standard device in use comprises separate chains or mud hooks which are removably held in place in desired locations around the tire by means of buckled straps. Another is the substantially one piece chain construction made of two side chains connected by cross chain loops which is removably mounted on the tire, and with the two ends of each side chain hooked together to make an endless construction. The separate mud hooks or cross chains have to be mounted in proper locations around the tire, but the modern construction of the automobile mud guard makes it difficult to reach up between the wheel and the mud guard to locate the chains at the top of the wheel. The one piece chain construction is even more difficult to put on, and it requires either jacking up the car and rotating the wheel or laying the chain on the ground and driving the car along over the chain after which the problem of hooking the free ends together must be met. These constructions are not easily used when the car is stuck in deep snow or mud. Hence all sorts of attempts have been made to devise a chain or a traction device which can be installed more easily.

The primary object of this invention is to provide a traction device for this general purpose which may be easily installed and removed without moving or lifting the car, and which is so constructed that the traction members may be laid on the tire in a convenient position and then readily moved around into place without requiring rotating the wheel and which may thereafter be secured in position for the required traction. Other objects will be apparent in the following disclosure.

Referring to the drawings illustrating the preferred embodiment of this invention:

Fig. 1 is a vertical elevation of the side of an automobile wheel with the traction device applied thereto;

Fig. 2 is a fragmentary vertical section therethrough;

Fig. 3 is a fragmentary view similar to Fig. 1, but with the traction hooks located close together at the beginning of the installation; and Fig. 4 is a fragmentary detail showing the arrangement of three of the traction hooks, the locating ring and the tension spring which holds them in place.

As illustrated in the drawings, this device comprises a set of traction members 10, such as 8 in number, which have hooked shaped portions 11 shaped to fit over an automobile rubber tire 12, which conforms substantially to the circular cross sectional curvature of half of the tire as shown in Fig. 2. Each hook 11 may have an outwardly turned end 14 or other shape which prevents the hook from doing any injury to the rubber of the tire during normal use. The round portion 15 of the hook may be corrugated or otherwise shaped to provide either a rough or a smooth surface to give the desired traction effect on the ground, and the inner side of the hook is preferably smooth so as not to injure the rubber. The traction device 10 is preferably made of a flat steel bar of a suitable size, such as ⅜ x ¾ inch in cross section for a small wheel or larger in section for a larger wheel. It will be understood that the automobile wheel illustrated generally at 16 in Fig. 2 and the associated tire 12 may be made in accordance with any standard construction.

The traction device 10 has a straight shank portion 18 which extends normally radially of the wheel, and the lower end of this straight portion is provided with a hook 19 adapted to be locked removably in one of a set of rings 20 of an endless spring tensioning device 21. Each ring 20 may be made as desired, such as a helix coil of resilient steel having one and a fraction turns with its coil ends in close contact. The springs of the tensioning device 21 are preferably made as a set of separate helical spring coils which have their ends formed as hooks that are locked into the rings 20, so as to make a permanent endless construction adapted to be placed under tension when in use. This endless spring 21 is intended to be hooked onto the hooks 19 after the traction devices 10 have had their curved portions 15 properly located on the tire.

In order to locate the separate traction devices 10 and hold them in place relative to the tire 12, I provide an endless steel ring 25 which is non-removably secured to the hook devices 10 but which permits free circumferential movement thereof. To this end, each hook shank is provided with an opening between its ends in which the ring is permanently mounted. In the form shown, this is accomplished by placing the shanks 18 in proper location relative to the ring 25 and then assembling a U-shaped clip 26 over the ring 25 and welding its ends to the straight shank portion 18. Each clip 26 and shank 18 thus form an opening of rectangular shape surrounding the circular ring 25, and this opening secures the hook 10 and its shank 18 irremovably to the ring 25. Yet the hook shanks may be freely slid around the ring 25 to adjust the hooks 10 from an initial assembly position (Fig. 3) to the final operative positions of Fig. 1 where the ring 25 holds the hooks securely in place. As shown in Fig. 2, the ring 25 is a flat bar made smaller in its radial direction than is the slot or opening formed between the ends 27 of the clip, and a slight play is also provided at the side of the ring so that the traction lug devices 10 may be slid freely around the ring as required during assembly. The clearance provided between the bar 25 and the ends 27 of the lug 26 permits the rubber tire to squeeze down under the load pressure and with a consequent upward free but limited radial movement of the shank 18 of the traction device. In this way, the weight of the vehicle on the traction device will not put an undue thrust against the ring 25 as the wheel revolves.

Referring now to Fig. 3 in particular, it will be appreciated that the installation of this device is simple. All of the traction members 10 are placed side by side in a suitable location on the wheel, which is illustrated in Fig. 3 as at a position just in front or back of the tire and next to the ground. That is, each of the hook portions 15 is hooked over the tire while the members are all close together and with the inner tensioning spring 21 absent. This is permitted by the opening in the clip 26 being large enough radially so that the ring 25 will not interfere with placing the hook shanks 18 in parallelism and at a required angle to radial lines of the ring 25, as shown in Fig. 3. Then the hooks 10, shown as 8 in number, are moved manually around the wheel by sliding them along the ring 25 one at a time to evenly spaced or desired locations, such as shown in Fig. 1. This is done by grasping the end shank portion 18 of each of the hook devices, and it is not necessary for the operator to place his hand up under the mud guard or otherwise to be inconvenienced materially by the this operation. In the operative position of ring and hooks, the ring 25 prevents removal of the hooks, since the radial movement of the hook shank relative to the ring is far less than the radial depth of the outer end 14 of the hook. The spring 21 merely serves to urge the parts into their working positions, but the ring 25 holds the hooks in place. After the hooks have been spread into their proper locations, then the spring 21 has its rings 20 hooked into the free outwardly turned hook ends 19 of the traction devices 10. If desired, the spring member 21 may have one of its rings 20 secured permanently to the hooks 19 of one of the taction members 10, so that it is always available and is a part of the construction and cannot be lost. The coil spring portions of this spring member 21 are of such length and their tensile strength and resiliency is such that they will pull the traction hooks 15 down snugly into place on the tire and hold them fairly firmly in position. It will, however, be noted that these traction hooks may creep around the tire as is sometimes required by heavy traction duty since the ring 25 does not restrain this circumferential movement. But the spring 21 urges these traction members into a definite location, so that if one of the hook devices 10 should move too far out of place, the tension of the adjacent coils of the spring 21 will tend to urge the other members of the assembly into equalizing pressure positions. It is found that in use although there is some creepage movement of the hook members yet this does not permit the hooks to slide around the ring into the initial assembly position of Fig. 3 but tends to keep them properly spaced for the required duty. Both of the traction devices may be mounted on the spare tire for storage purposes and thus are readily available for use without taking up other space in the car trunk. The matter of taking off the anti-skid or traction device is equally simple. The rings 20 of chain 21 are merely unhooked from the hooks 19 of the traction devices, and then by grasping the shanks 18 the devices 10 are moved around to a convenient position near the bottom of the wheel where they may be very readily lifted all in one direction substantially radially of the wheel to remove them from the tire. All operations are performed from in front of the wheel, and neither the car nor the wheel needs to be moved.

Various modifications of the device will now be apparent to one skilled in the art, and it is to be understood that the above description of the preferred embodiment of the invention is not to be interpreted as imposing limitations on the appended claims.

I claim:

1. An automobile tire traction device comprising a set of traction hooks shaped to be removably hooked over the tire tread in a spaced relationship, a ring adapted to be mounted outside of and adjacent to the wheel concentric to but radially inwardly of the tire tread, means for irremovably securing the ring to the hooks and permitting free circumferential movement of each hook relative to and around the ring to provide for assembly of the hooks on the tire at one general location, and a spring tension device connected to the inner ends of the hooks which yieldingly urges each hook into a traction position relative to the tire and provides for creepage thereof.

2. An automobile tire traction device comprising a set of traction hooks shaped to be removably hooked over the tire tread which have radial shanks, a circular rigid metal ring concentric with the tire tread shaped to be operatively mounted on the outside of the wheel radially inwardly of the tread, means for slidably securing the shanks to the ring and permitting free circumferential movement of the shanks entirely around the ring and a limited radial movement of the shanks relative to the ring as the tire is compressed by a load during rotation, and a continuous spring tensioning device connected to the shanks resiliently urging the shanks radially inwardly of the tire and providing for creepage of the hooks around the tire, said ring serving to prevent removal of the hooks from the tire when assembled in operative positions.

3. A device according to claim 2 in which each shank has the traction hook at its outer end and a hook at its inner end and a narrow opening between its ends in which the ring is irremovably mounted, the openings in the several shanks being radially wider than the ring and providing for a limited radial movement of all the shanks to positions of substantial parallelism at one general location relative to the tire, and wherein the tensioning device is an endless chain engaging the inner hooks and having resilient linkages between adjacent hooks.

OZZIE F. CALOIARO.

References Cited in the file of this patent

UNITED STATES PATENTS

| Number | Name | Date |
| --- | --- | --- |
| 1,822,748 | Rivers | Sept. 8, 1931 |
| 2,326,618 | Carlson | Aug. 10, 1943 |
| 2,528,165 | Nickerson | Oct. 31, 1950 |